United States Patent
Spahn

(10) Patent No.: US 7,471,767 B2
(45) Date of Patent: Dec. 30, 2008

(54) SYSTEMS AND METHODS FOR DETERMINING IMAGE ACQUISITION PARAMETERS

(75) Inventor: Martin Spahn, Chicago, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 11/546,772

(22) Filed: Oct. 12, 2006

(65) Prior Publication Data

US 2007/0269019 A1 Nov. 22, 2007

Related U.S. Application Data

(60) Provisional application No. 60/797,488, filed on May 3, 2006.

(51) Int. Cl.
H05G 1/10 (2006.01)

(52) U.S. Cl. .......................... 378/95; 378/101; 378/115; 378/207

(58) Field of Classification Search ................... 378/64, 378/68, 69, 91, 95–98.2, 101, 108–118, 207; 382/128, 132
See application file for complete search history.

(56) References Cited

U.S. PATENT DOCUMENTS

| | | | | |
|---|---|---|---|---|
| 5,119,409 | A * | 6/1992 | Nields et al. ................. | 378/106 |
| 6,208,708 | B1 | 3/2001 | Hoheisel et al. ............... | 378/37 |
| 6,429,414 | B1 | 8/2002 | Spahn ...................... | 250/208.1 |
| 6,477,228 | B2 | 11/2002 | Spahn ......................... | 378/62 |
| 6,655,836 | B2 | 12/2003 | Boehm et al. ................ | 378/207 |
| 6,707,881 | B2 | 3/2004 | Boehm et al. ............... | 378/98.7 |
| 6,718,011 | B2 | 4/2004 | Spahn ....................... | 378/98.8 |
| 6,763,084 | B2 | 7/2004 | Boehm et al. ................ | 378/62 |
| 6,859,521 | B2 | 2/2005 | Spahn ........................ | 378/117 |
| 6,912,266 | B2 | 6/2005 | Spahn ...................... | 378/98.8 |
| 7,046,757 | B1 | 5/2006 | Bani-Hashemi et al. ........ | 378/7 |
| 7,056,018 | B2 | 6/2006 | Stierstorfer et al. ......... | 378/207 |
| 7,073,939 | B2 | 7/2006 | Spahn ........................ | 378/196 |
| 7,075,061 | B2 | 7/2006 | Spahn ..................... | 250/252.1 |
| 7,153,268 | B2 * | 12/2006 | Li et al. ...................... | 600/455 |
| 2002/0150214 | A1 | 10/2002 | Spahn ........................ | 378/189 |
| 2004/0092813 | A1 * | 5/2004 | Takizawa et al. ............ | 600/423 |
| 2005/0161610 | A1 | 7/2005 | Spahn ................... | 250/370.09 |
| 2005/0218296 | A1 | 10/2005 | Spahn ..................... | 250/208.1 |
| 2006/0133658 | A1 | 6/2006 | Spahn ........................ | 382/128 |
| 2006/0188063 | A1 | 8/2006 | Spahn ......................... | 378/95 |
| 2007/0025503 | A1 * | 2/2007 | Hemmendorff .............. | 378/37 |

OTHER PUBLICATIONS

"Adaptive Spatial-temporal filtering applied to x-ray fluoroscoopy angiography" by Gert Schoonenberg. et al.

(Continued)

Primary Examiner—Jurie Yun
(74) Attorney, Agent, or Firm—Alexander J. Burke; Peter L. Kendall

(57) ABSTRACT

An x-ray imaging system that constantly evaluates and determines optimal image acquisition parameters, such as frame rate and pulse length, based on the application and motion detection during an x-ray acquisition scene, and applies optimal image acquisition parameters accordingly. The x-ray imaging method includes accessing previous image data and accessing present image data. Motion between the present image data and at least a portion of the previous image data is detected and the one or more image acquisition parameters are determined as a function of the detected motion.

28 Claims, 10 Drawing Sheets

OTHER PUBLICATIONS

"Motion Detection Algorithms" by Andrew Kirillov; posted Apr. 30, 2005.

"A quantitative comparison of motion detection algorithms in fMRI" by Babak A. Ardekami, et al; received Apr. 11, 2001; accepted Jun. 17, 2001.

"Retrospective Motion Correction in Digital Subtraction Angiography: A Review" by Erik H. W. Meijering, et al.; IEEE Transactions on Medical Imaging. vol. 18, No. 1, Jan. 1999, pp. 2-21.

"Motion Detection for Adaptive Spatio-Temporal Filtering of Medical X-Ray Image Sequences" by Marc Hensel, et al.; 2005 Springer. In: H.-P. Meinzer, et al. (Edt.): *Bildverarbeitung für die Medizin 2005: Algorithmen, Systems, Anwendungen*, Springer, 2005 (ISBN 3-540-25052-2). Proceedings BVM 2005, Heidelberg, Germany, Mar. 13-15, 2005.

"A 3-D space-time motion detection for an invariant image registration approach in dig angiography" vol. 97, Issue 1 (Jan. 2005).

"Evaluating Motion Detection Algorithm: Issues and Results" by J. Renno, et al.

"Motion Detection and Recognition Research" by Randal C. Nelsonand, et al.

"A Robust and Computationally efficient motion detection algorithm based on background estimation" by A. Manzenera, et al.

Chapter 10. "Controlling Frame Rate" Part II. Programming with OpenGL Performer.

* cited by examiner

SYSTEMS AND METHODS FOR DETERMINING IMAGE ACQUISITION PARAMETERS

CROSS-REFERENCE TO RELATED APPLICATIONS

This application claims a priority benefit to prior provisional application Ser. No. 60/797,488, filed on May 3, 2006 and entitled "X-ray Imaging Systems With Variable Frame Rates," which is hereby incorporated by reference in its entirety herein.

BACKGROUND

1. Field of the Invention

The present invention relates generally to imaging systems and methods. More particularly, the present invention is directed to x-ray imaging systems and methods that determine acquisition parameters such as frame rates and/or pulse lengths as a function of detected motion.

2. Background Discussion

Radiography is the use of certain spectra of electromagnetic radiation, usually x-rays, to image a human body. Angiography, a particular radiographic method, is the study of blood vessels using x-rays. An angiogram uses a radiopaque substance, or contrast medium, to make the blood vessels visible under x-ray. Angiography is used to detect abnormalities, including narrowing (stenosis) or blockages (occlusions), in the blood vessels throughout the circulatory system and in certain organs.

Cardiac angiography, also known as coronary angiography, is a type of angiographic procedure in which the contrast medium is injected into one of the arteries of the heart, in order to view blood flow through the heart, and to detect obstruction in the coronary arteries, which can lead to a heart attack.

Peripheral angiography, in contrast, is an examination of the peripheral arteries in the body; that is, arteries other than the coronary arteries. The peripheral arteries typically supply blood to the brain, the kidneys, and the legs. Peripheral angiograms are most often performed in order to examine the arteries which supply blood to the head and neck, or the abdomen and legs.

Conventional x-ray imaging systems that are used in radiography and angiography for diagnostic or interventional procedures utilize fixed frame rates. That is, a particular number of images are acquired per second. The fixed frame rate is usually selected based on the particular procedure being performed.

Some examples of procedures using conventional x-ray imaging systems that utilize fixed frame rates include:
  obtaining a single image for radiographic applications (for example, a chest x-ray);
  obtaining a sequence of fluoroscopic images (a fluoroscopic scene), running at 10 fps (frames per second), to place a catheter in a neurological procedure;
  obtaining a sequence of acquisition images (an acquisition scene), running at 30 fps, to visualize the left coronal arteries of an adult in a coronary application;
  obtaining an acquisition scene, running at 60 fps, in a pediatric application;
  a fluoroscopic scene, running at 30 fps, to place a catheter, and to thereby obtain the coronary acquisition sequence described above; and
  a three-dimensional run (for example, a sequence of images while an x-ray tube and detector rotate around an object), running at 30 fps.

One drawback of conventional x-ray imaging systems is that while they permit selection between different frame rates based on procedure and application, unfortunately they do not permit frame rates to be changed during a scene. (A scene is defined as a consecutive sequence of images which is acquired while an operator operates the x-ray release switch without interruption; for example, a footswitch or a hand switch.) In order to change the frame rate, the operator must stop the sequence, change the frame rate via a user interface, and resume the procedure, which subsequently generates a new image sequence with the new frame rate setting.

Another drawback to conventional x-ray imaging systems is that an operator is limited to the selection of a small finite number of possible frame rates. For example, present x-imaging ray systems only support frame rates of 60, 30, 15, 8, 4, 2, 1, and 0.5 frames per second. Other frame rates in between are not supported. When object motion is present, information may be lost if the operator has not, for whatever reason, increased the frame rate. Conversely, when object motion is not present, if the operator has not, for whatever reason, decreased the frame rate, both the patient and the operator will be exposed to a greater than necessary dose of x-rays.

Still a further drawback to conventional x-ray imaging systems is that a pulse length (that is, a length of the x-ray pulse used to acquire an image) cannot be adjusted automatically as a function of object motion. The pulse length is an important factor in obtaining optimum image quality—pulse length determines sharpness within a single image. When object motion is present, the acquired object in the image may appear less sharp, or more smeared, the longer the pulse length of the x-ray pulse. Therefore, a minimum pulse length is optimal. However, other parameters may limit a short pulse length, for example, the tube power limitations.

In general, a drawback of conventional x-ray imaging systems is the use of fixed and predetermined image acquisition parameters, that can only be changed, or modified, by an operator by stopping and then resuming an imaging sequence.

Therefore, it would be an advancement in the state of the imaging art to provide a variable frame rate x-ray imaging system that enhances image quality and improves the efficiency of the imaging procedure.

It would be an additional advancement in the state of the art to provide a variable pulse length x-ray imaging system that enhances image quality.

It would be further advantageous to provide an x-ray imaging system that supports both a variable frame rate and a variable pulse length, so as to maximize the image quality and the efficiency of the imaging procedure.

In general, it would be an advancement in the imaging art to provide an imaging system that dynamically adjusts image acquisition parameters as a function of detected motion.

SUMMARY

In view of the foregoing, the present invention provides an improved x-ray imaging system that supports variable acquisition parameters, such as variable frame rates and variable pulse lengths, which improves image quality and streamlines the imaging procedure.

Accordingly, an embodiment of the present invention is directed to a method for determining one or more image acquisition parameters ("the method"). The method includes accessing previous image data and accessing present image data. Motion between the present image data and at least a portion of the previous image data is detected and the one or more image acquisition parameters are determined as a function of the detected motion.

Another embodiment of the present invention is directed to the method described above in which the image acquisition parameters include least a frame rate or pulse length or both a frame rate and a pulse length.

Yet another embodiment of the present invention is directed to the method described above that also includes acquiring and generating image data, including the previous image data and present image data. Furthermore, the acquiring and generating step may be based on the determined image acquisition parameters. That is, in an embodiment of the invention, the determined acquisition parameters are used to dynamically adjust the image acquisition and generation.

Yet another embodiment of the present invention is directed to the method described above that also includes emitting x-rays and detecting the emitted x-rays. The image data (including present and previous image data) is generated from the detected x-rays.

Yet another embodiment of the present invention is directed to the method described above that also maintains a focus setting of the emitted x-rays when detected motion does not exceed a predetermined threshold.

Yet another embodiment of the present invention is directed to the method described above that also emits a required dose of x-rays while a power setting of the emitted x-rays does not exceed a predetermined threshold.

Yet another embodiment of the present invention is directed to the method described above that also prevents over-heating of an x-ray unit while a power setting of the emitted x-rays does not exceed a predetermined threshold.

Yet another embodiment of the present invention is directed to the method described above wherein the determining step determines the image acquisition parameters as a function of biometric data. Biometric data may include, for example, a phase of a heart beat or cardiac data.

Yet another embodiment of the present invention is directed to the method described above wherein the motion detecting step also compares the present image data to at least a portion of the previous image data.

Yet another embodiment of the present invention is directed to the method described above wherein the image acquisition parameter is increased when the detected motion is above a predetermined threshold. Also, the image acquisition parameter is decreased when the detected motion is below a predetermined threshold. The image acquisition parameter may be decreased when the detected motion is above a predetermined threshold and the image acquisition parameter may be increased when the detected motion is above a predetermined threshold.

Yet another embodiment of the present invention is directed to the method described above that also determines an optimum time until a subsequent image acquisition.

Yet another embodiment of the present invention is directed to the method described above that also determines the image acquisition parameters as a function of relative motion detected in the present image data.

Yet another embodiment of the present invention is directed to the method described above that also determines a quantity of an agent, such as a contrast agent or an adhesive, as a function of the determining step.

Yet another embodiment of the present invention is directed to the method described above where the image acquisition parameter is maintained greater than or equal to a minimum value.

Embodiments of the present invention also include the methods described above implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION

Figure 1:
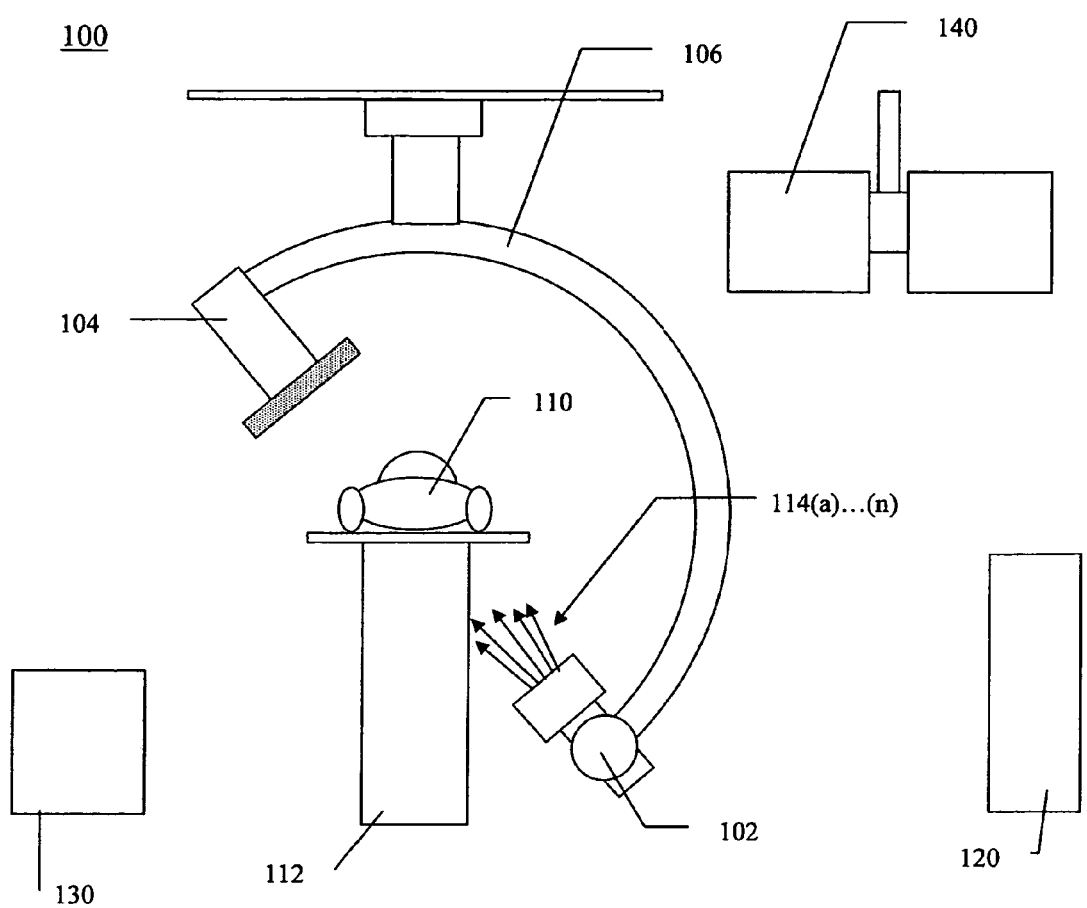
FIG. 1 shows an imaging system used with various embodiments of the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of-hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

A detailed description of radiography, angiography, and x-ray imaging systems may be found in the following treatises:

Baum, Stanley and Michael J. Pentecost, eds. *Abram's Angiography*, 4th ed. Philadelphia: Lippincott-Raven, 1996, which is hereby incorporated by reference in its entirety herein;

Jeanne, LaBergem, ed. *Interventional Radiology Essentials*, 1st ed. Philadelphia: Lippincott Williams & Wilkins, 2000, which is hereby incorporated by reference in its entirety herein; and Johns, Harold E. and John R. Cunningham. *Physics of Radiology*, 4th ed. Charles C. Thomas Publisher Ltd., 1983, which is hereby incorporated by reference in its entirety herein.

Embodiments of the present invention utilize both variable frame rates and variable x-ray pulse lengths (acquisition parameters) to enhance image quality and procedure efficiency. Variable frame rates and variable x-ray pulse lengths may be applied either separately or in combination. The variable frame rates and the variable pulse lengths are dynamically selected by the x-ray system. The dynamic selection is based on, among other things, motion detected in an image sequence. More specifically, a control mechanism may predict an optimum time that may elapse until the next x-ray image is taken without loss of information. This information is typically provided to the radiologist(s), cardiologist(s), technician(s), or other user(s) of the system.

The embodiments of the present invention are readily applied to fluoroscopic imaging, which utilize low dose x-rays per image but use relatively high frame rates and relatively long sequences. Fluoroscopic imaging is typically used to insert and place medical imaging conduits or other medical devices, such as catheters, wires, guide wires, stents, balloons, and other diagnostic and/or interventional apparatus, generally referred to as "medical devices" herein.

Furthermore, fluoroscopic images (or roadmapping, which is a subtraction type of fluoroscopic imaging) may also be used to inject contrast media, adhesive materials, or other materials to block or fill blood vessels. The capability of having variable frame rates available for these fluoroscopic procedures is particularly advantageous, as the motion of the catheter increases or decreases as it is moved towards or away from certain internal organs (for example, the heart, lungs or brain) as well as portions of the patient's body (for example, the abdomen, head, etc), which all have their own intrinsic motion. The motion of the medical device (i.e., catheter) may also increase or decrease as the operator of the apparatus is more or less actively advancing, repositioning, or turning the medical device inside the patient.

Additionally, during the imaging procedure, patients may move or change their position slightly or unexpectedly. For example, some patients may stay relatively still during an imaging procedure while other patients, such as children, may be more inclined to shift their bodies, causing the imaging procedure to become more complicated. In addition, mechanical movements (such as movement of a table supporting the patient) and unexpected movement of the imaging equipment may introduce motion from image to image. The fluoroscopic procedures typically represent a significant portion of the x-ray dose, or exposure, acquired by both the patient and the operator of the imaging equipment during the imaging procedure.

Therefore, it is advantageous to permit the imaging system to dynamically and continually select a minimum required frame rate, which makes the object of interest (e.g., medical device, organ, etc.) sufficiently visible, so that the x-ray dosage may be conserved, or a higher dose per image may be expended to obtain maximum image quality. (Image quality being determined by contrast, clarity, distinctive lines, color, etc.)

Optimum frame rate selection is obtained by utilizing one or more motion detectors that analyze a change of structure, outlines, or objects from one or more previous images to the actual, or current image. This change information is used to predict the optimum subsequent, next, or "future" frame rate, which may also be expressed as the time interval to the next image.

Another component of obtaining optimum image quality is the acquisition parameter of pulse length (that is, the length of the x-ray pulse) used to acquire a particular image. Pulse length is a significant parameter determining sharpness within a single image. When object motion is present, the acquired object in the image may appear less sharp or more smeared, the longer the pulse length of the x-ray pulse. Therefore, a minimum pulse length is optimal. However, other parameters may limit a short pulse length, for example, the tube power limitations.

The tube power is influenced by the size of the x-ray focus selected (i.e., tubes may have a micro, small, or large focus, each one having different power limitations—micro focus having the highest power). The angulation of a support member, such as a C-arm, of an imagining apparatus with respect to the patient and the demanded dose (or signal) on the detector may further influence the power and x-ray spectrum settings (x-ray tube voltage, measured for example in kilovolts (kV), and current-time product or "mAs" product).

Using a motion detector, or sensor, to relax the pulse length if no (approximately zero) or little (minimal) motion is detected can help to, for example:

deliver the required dose (or signal) at the detector while keeping the power setting (kV) low—which is generally advantageous for high object contrast;

facilitate heating of the x-ray tube which will result in longer scene times or reduce power (kV) values;

refrain from switching from micro focus to small focus, which enhances image sharpness; and allow a shorter pulse length if motion is detected and enhance image sharpness.

Other image acquisition parameters that may be adjusted as a function of detected motion include temporal filtration and focal spot sizes, among others. A temporal filter adds past, or previous, image data to the actual, or present, image data in order to suppress noise (x-ray quantum or electronic noise). If there is little motion, more past, or previous, image information may be added in the averaging process to generate better noise suppression. In turn, this may lead to a reduction in applied dose per image (the individual image will have a worse signal-to-noise ratio, but due to increased averaging of previous image data, this effect will be compensated). The focal spot size is inversely related to the available power (and in turn, the number of x-ray quanta per unit time) due to heating limitations of the anode of the x-ray tube. X-ray tubes generally have two or three different focal spot sizes (for example, a micro, a small, and a large focus). A larger focus will generate less sharp, or more smeared, images but will be able to produce a given dose (or number of x-ray quanta) in a shorter time than a small focus. Hence, adjusting a focal spot size, based on detected motion, is also within the scope of the present invention.

FIG. 1 shows a system 100 for peripheral or cardiac angiography to which the present invention is applied. According to an embodiment of the invention illustrated in FIG. 1, a patient 110 is placed on a table 112. A support member, such as a C-arm, 106 supports an x-ray emitting unit, such as an x-ray tube, 102 and an x-ray detecting unit, such as an x-ray detector, 104. The x-ray emitting unit 102 is adapted to emit x-rays 114(*a*) . . . (*n*) (identifying a plurality of x-ray signals), and the x-ray detecting unit 104 is adapted to absorb and measure the emitted x-rays. Sensors may be mounted on emitter unit 102 and detect relative motion of the emitter unit 102. Sensors may also be mounted on table 112 and detect relative motion of the table 112 and/or patient 110. Sensors may also be mounted on detector unit 104 and detect relative motion of the detector unit 104. Images of all or parts of the patient 110 may be obtained using the x-ray emitter 102, x-ray detector 104, and x-rays 114. The images typically assist in the diagnosis and/or treatment of the patient 110.

A generator unit 120 is used to generate the x-rays emitted by the x-ray emitting unit 102. The x-ray generator 120 is typically, for example, an x-ray producing device that includes a source of electrons, a vacuum within which the electrons are accelerated, and an energy source that causes the electrons to be accelerated.

A system control unit and imaging system 130 controls the operation of the entire system 100, performs image processing, and transmits the image data for display on the image display unit 140. The display unit 140 is used to display the image data generated by the system 100. The display unit 140 may be, for example, a monitor, LCD (liquid crystal display), a plasma screen, or other module adapted to display output data typically by a representation of pixels. The system control and imagining system 130 includes a processor and memory modules and is described in relation to FIG. 4.

Figure 2A:
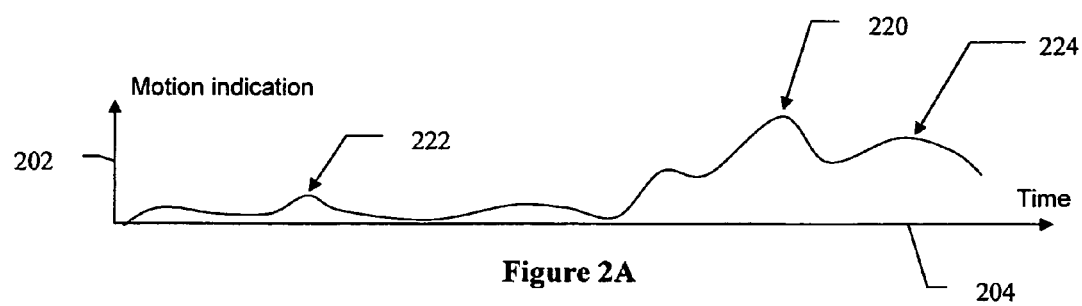
FIGS. 2A, 2B and 2C show operation of a fixed frame rate imaging method.
Figure 2B:
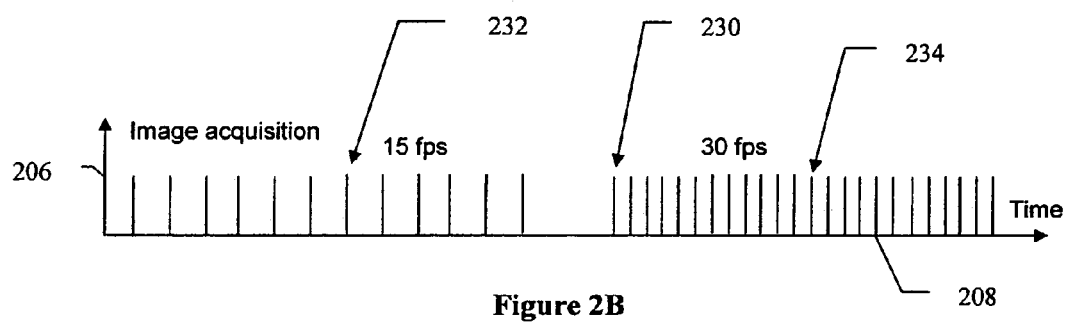
Figure 2C:
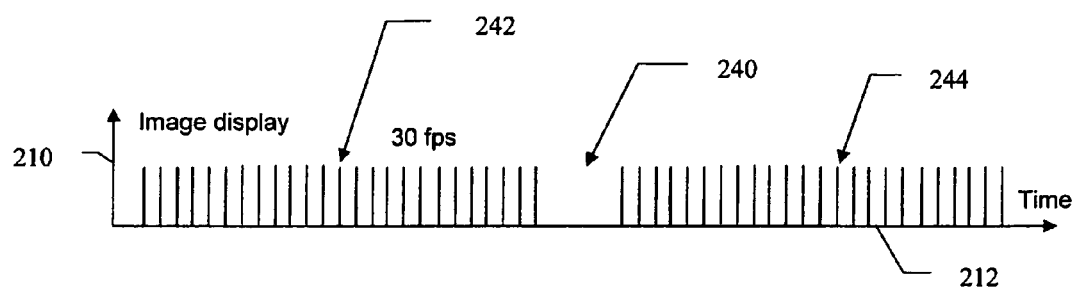

FIGS. 2A, 2B, and 2C illustrate operation of an x-ray imaging system. The maximum relative motion (of, for example, an organ or catheter) is illustrated in FIG. 2A. FIG. 2A illustrates, in graphical form, detected motion as a function of time. Relative motion indication is plotted on the y-axis 202 and time is plotted on the x-axis 204. Line 220 illustrates the magnitude of detected motion and includes portions 222 and 224. Portion 222 shows that less motion is detected than the motion detected at portion 224.

FIG. 2B shows fixed image frame rates for two image sequences (portions 232 and 234, respectively). Image acquisition is plotted on the y-axis 206 and time is plotted on the x-axis 208. An operator manually selects a higher frame rate for the second scene, shown as portion 234, as more motion is anticipated. Portion 230 identifies a demarcation between portions 232 and 234. As shown in FIG. 2B, image data was lost in portion 230 because the acquisition sequence was paused by the operator in order to adjust the frame rate.

FIG. 2C shows an image display operation. Image display is plotted on the y-axis 210 and time is plotted on the x-axis 212. Portions 242 and 244 show image display at 30 fps. Portion 240 indicates a demarcation between portions 242 and 244. Image display runs at a frequency that is at least as high as the time resolution of the human eye, for example, approximately 30 fps or 60 fps, and may involve the repetition of images, as shown in FIG. 2C.

Figure 3A:
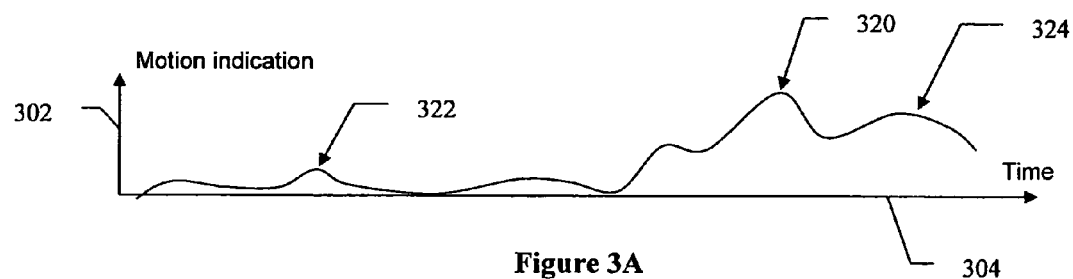
FIGS. 3A, 3B and 3C show operation of a variable frame rate imaging method.
Figure 3B:
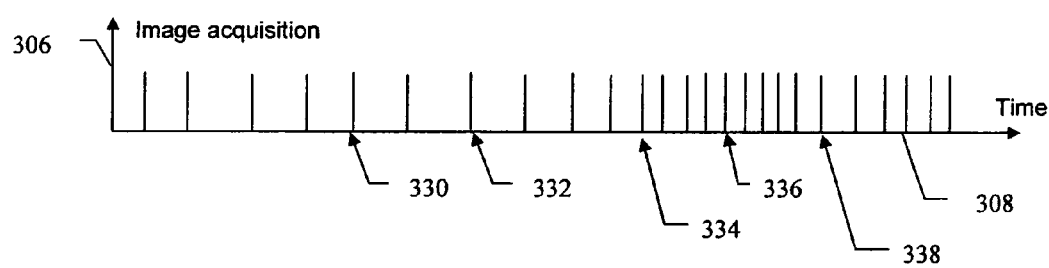
Figure 3C:
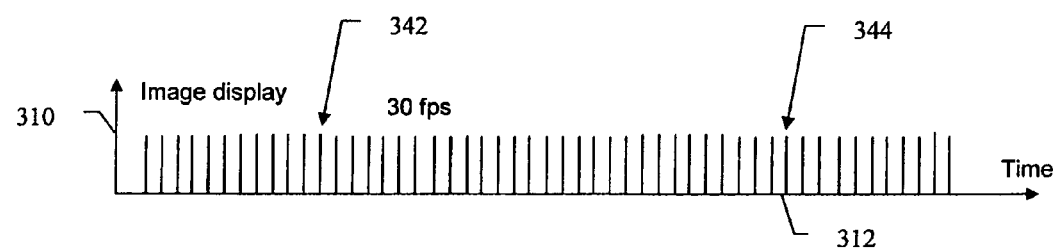

FIGS. 3A, 3B, and 3C illustrate an embodiment of operation of the present invention. FIG. 3A illustrates maximum motion (of, for example, an organ or catheter). FIG. 3A illustrates, in graphical form, motion as a function of time. Motion indication is plotted on the y-axis 302 and time is plotted on the x-axis 304. Line 320 illustrates the magnitude of detected motion and includes portions 322 and 324. Portion 322 shows that less motion is detected than the motion detected at portion 324.

FIG. 3B illustrates that an optimum acquisition parameter (i.e., variable frame rate) is deduced from motion detected in previously acquired images. This approach allows continuation of the procedure without stopping the x-ray acquisition sequence. Image acquisition is plotted on the y-axis 306 and time is plotted on the x-axis 308. Portions 330, 332, 334, 336, and 338 show examples of image data. For example, at the time when image 332 is acquired, image 330 is previous image data since it was acquired prior to acquisition of image 332. Further, image 334 is after image 332 but prior to image 336. Therefore, one or more previous image data (330, 332) may be used to generate an acquisition parameter such as frame rate, pulse length, temporal filtration, or a focal spot size for a subsequent image (334). The subsequent image acquisition parameter may be a function of sequentially previous image data, or an accumulation of previous image data. Thus, an acquisition parameter of image 336 may be a function of acquisition parameters of image 334 as well as of images 330, 332, and 334, or any permutation thereof. Thus, the acquisition parameters (e.g., frame rate, pulse length, etc.) may be determined based on a sampling of detected motion of all of the previous image data, a selected portion of the previous image data, or the immediate portion of the previous image data.

FIG. 3C illustrates a continuous image display, which provides for enhanced output and is easier for physicians, technicians, and operators to comprehend. Image display is plotted on the y-axis 310 and time is plotted on the x-axis 312. Portions 342 and 344 illustrate that an approximately steady image display is produced at a speed of 30 fps. As shown in FIG. 3C, according to an embodiment of this invention, no image data was lost because no interruption in the acquisition sequence was necessary.

Figure 4:
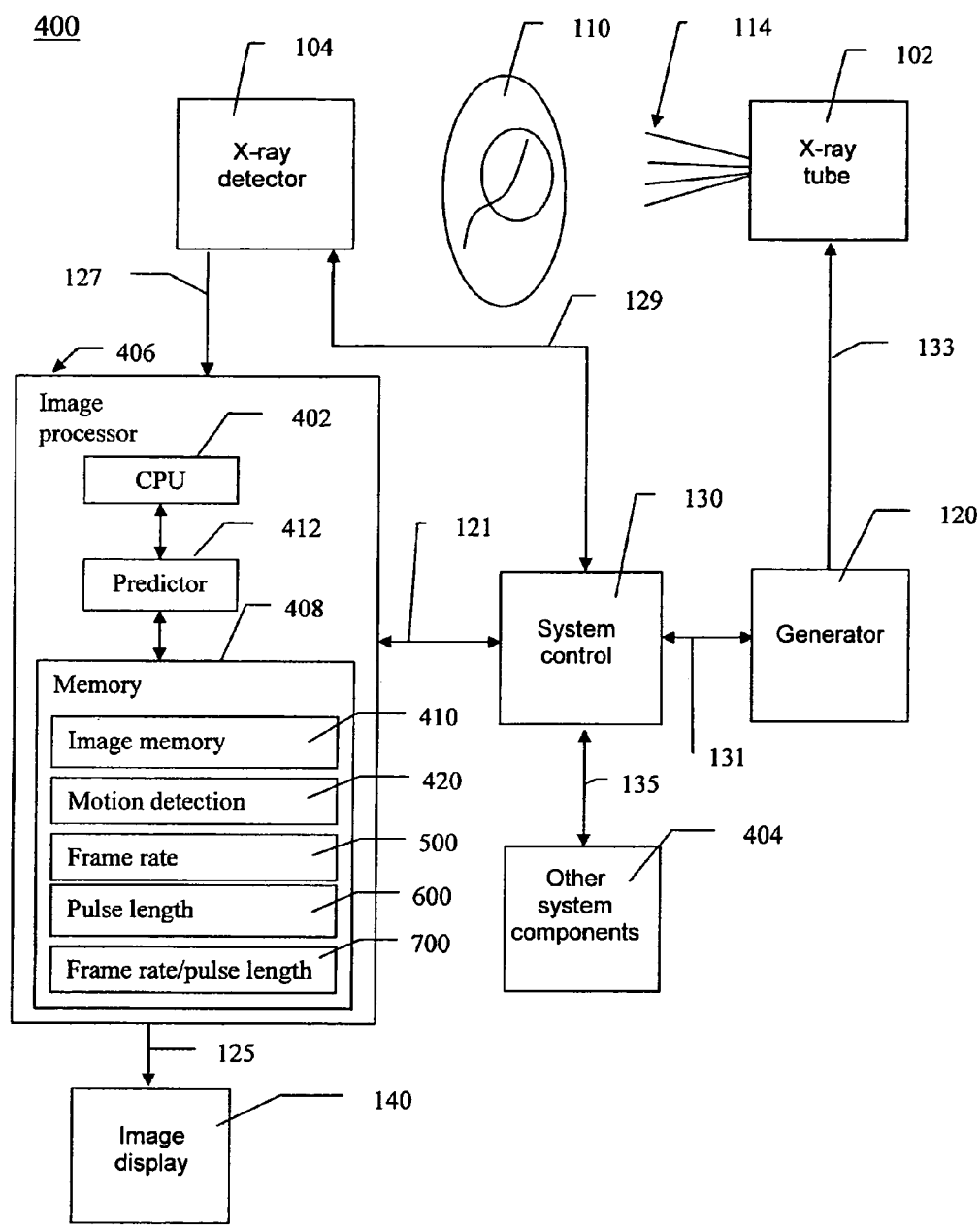
FIG. 4 shows components of an embodiment of an imaging system utilizing variable acquisition parameters.

FIG. 4 is a diagram 400 showing selected components used in parameter acquisition, evaluation, and control. Examples of such parameters, as stated previously, include variable frame rates and x-ray pulse lengths. As shown in FIG. 4, x-rays 114 are emitted from an x-ray emitting unit, such as an x-ray tube, 102 and directed toward a patient 110. X-rays are detected by an x-ray detecting unit 104. The detected x-rays are transmitted, via transmission medium 127, which is typically a wire connection, communication bus, such as an IEEE bus, or other data transmission medium suitable to transmit data signals or pulses that represent the output from x-ray detector 104, to an image processing module 406. The image processing module 406 (described in more detail below) is in bi-directional communication, via transmission medium 121, which may be a wire, wireless, or communication bus or other transmission medium suitable to transmit data signals, with system control unit 130 (described in more detail below) and is in communication with image display unit 140, via transmission medium 125. The image processor 406 processes the acquired image data and provides the output to system control unit 130, which is in bi-directional communication, via transmission medium 135, with other system components 404.

The system control unit 130 provides control signals to generator unit 120, via transmission medium 131. The generator unit 120 adjusts, if necessary, the x-rays emitted by x-ray emitting unit 102, via control signals transmitted using transmission medium 133. The system control unit 130 provides control signals to x-ray detector 104, via transmission medium 129, which adjusts, if necessary, the detection of the emitted x-rays by the x-ray detecting unit 104.

The image processing module 406 includes a central processing unit (CPU) 402, which is in bidirectional communication with predictor module 412 and memory module 408.

The CPU 402 is typically a processor that includes an arithmetic logic unit, (ALU), which performs arithmetic and logical operations, and a control unit (CU), which extracts instructions from memory and decodes and executes them, utilizing the ALU when necessary.

Predictor module 412 is a processing module, adapted to perform data processing and manipulation, that is in bidirectional communication with memory module 408 and CPU 402. The predictor module 412 receives input from image memory module 410 and motion detector module 420 as well as variable frame rate algorithm module 500 and/or pulse length algorithm module 600 and/or combined frame rate and pulse length module 700 to predict an adjustment to one or more acquisition parameters. The predictor module 412 includes program code to detect relative motion between the previous image data and the present image data, which is stored in image memory module 410. This relative motion quantity may be transmitted to system control unit 130, via transmission medium 121. Alternatively, the predicting function and/or motion detecting function, performed by predictor module 412, may be performed by CPU 402.

The memory module 408 includes image memory module 410, motion detection module 420, variable frame rate algorithm module 500, pulse length algorithm module 600, and combined frame rate and pulse length algorithm module 700.

Image memory module, or facility, 410 is used to store image data either received from the x-ray detecting unit 104 or generated by the CPU 402 of the image processor 406 based on detected x-rays from x-ray detecting unit 104. This includes previous image data and present image data. The image memory 410 is typically an electronic storage medium adapted to store received data in electronic form and may be solid state storage, such as random access memory (RAM) or cache memory. It may also include recorders to record and read from mass storage devices such as, for example, optical disks, magnetic disks, flash semiconductor disks, and other types of storage which may be temporary or permanent. The image memory may be accessed such that the contents of the memory are provided to the predictor module 412, the CPU 402, and/or system controller 130. Once the data has been accessed, typically by program code to fetch, or retrieve, the desired data stored in memory, it may be processed to determine the one or more image acquisition parameters as a function of the motion detected.

Motion detection module, or facility, 420 identifies detected motion in the image data, stored in image memory module 410. The motion detection module 420 includes electronic storage capabilities and stores the detected motion data, as well as provides the detected motion data to CPU 402 and predictor module 412, which can process the detected motion data. Examples of techniques for obtaining motion data are described in more detail below. The detected motion data is used to adjust the acquisition parameters.

Memory module 500 is typically an electronic storage medium that stores a variable frame algorithm, which is a series of steps to adjust, or modify, the frame rate of the acquisition of the image data. The output of the variable frame algorithm module is provided to the predictor module 412 and/or the CPU 402. The variable frame algorithm is described in more detail with relation to FIG. 5.

Memory module 600 is typically an electronic storage medium that stores a pulse length algorithm, which is a series of steps to adjust, or modify, the pulse length of the acquisition of the image data. The output of the pulse length algorithm module is provided to the predictor module 412 and/or the CPU 402. The pulse length algorithm is described in more detail with relation to FIG. 6.

Memory module 700 is typically an electronic storage medium that stores an algorithm, which is a series of steps to adjust, or modify, the frame rate and/or pulse length of the acquisition of the image data. The output of the frame rate and pulse length algorithm is provided to the predictor module 412 and/or the CPU 402. This algorithm is described in more detail with relation to FIG. 7.

The image processor 406 outputs an adjusted, or modified, image acquisition parameter (such as an adjusted frame rate or an adjusted pulse length). This output may be provided to image display module 140 and/or system control module 130, via transmission media 125 and/or 121, respectively.

The output from the image processing module 406 may be provided to image display module 140, via transmission medium 125. The image display module 140 is typically a monitor, LCD (liquid crystal display), a plasma screen, or other graphical user interface that can display output data. Also, the image display module 140 may be coupled to another CPU, processor, or computer, such as a desktop computer or a laptop computer (not shown) and may also be coupled to a keyboard, a mouse, a track ball, or other input device (not shown) to adjust the view, dimensions, color, font, or display characteristics of the image display module 140.

The image processing module 406 and/or image display module 140, may also be coupled to a printer (not shown) to print the output; or a transmission module, such as a DSL line (not shown) or a modem, such as a wireless modem (not shown), to transmit the output to a second location or another display module.

By adjusting the frame rate and/or pulse length based on detected motion in previous image data, data of higher quality is generated. For example, starting with an initial frame rate, the current image is compared to at least one previous image (if available). The motion detector memory module 420 provides input to the frame rate predictor 412, which in turn provides the required information to the system controller 130. The motion detection algorithm is described in more detail below. Image processing, such as defect correction, image enhancement, edge detection, etc., may occur before and/or after the motion detection. The system controller 130 controls x-ray emitter 102 and x-ray detector 104, as well as other components, if necessary, with the updated acquisition parameter information (i.e., new frame rate or new pulse length).

Motion Detection

In order to determine acquisition parameters, motion is detected between previous image data and present, or current, image data. A simple two-dimensional motion detection algorithm is based on differentiation (that is, subtraction of the previous image from the present image). If any signal other than noise is detected in the differentiated image, then motion is determined to have occurred. The locations of edges (connected or spatially-correlated areas of non-zero signal in the differential image) directly identify areas of motion within the image. A more sophisticated example of a three-dimensional motion detection algorithm is designed to take advantage of three characteristics of x-ray image data: (a) the motion can be modeled as a rigid body motion in three-dimensions described by a set of six parameters (three rotations about the axes and three translations along the axes of a Cartesian coordinate system); (b) the image contrast does not change appreciably from one volume to the next; and (c) the motion is generally small compared to image resolution.

Assuming $f_n(r)$ represents the nth volume from a total of N volumes acquired during an experiment (n=1, 2, ..., N), where $r=[x \ y \ z]^T$ is a position vector variable pointing to the space coordinates (x, y, z), properties (a) and (b) above imply the following model relating the nth volume $f_n$ to the first $f_1$:

$$f_n(r)=\alpha_n f_1(R_n r+t_n)+e_n(r) \quad (1)$$

where $R_n$ is a 3×3 orthonormal rotation matrix with a determinant of 1 (i.e., no reflection) fully characterized by three rotational parameters, $t_n$ is a 3×1 translation vector comprised of three translational parameters, and $e_n(r)$ represents noise. The factor $\alpha_n$ accounts for a possible global difference in intensity between the two volumes. The matrix $R_n$ and vector $t_n$ represent the motion from time point 1 to time point n. The objective of motion detection algorithms is to estimate, as accurately as possible, the six parameters that specify $R_n$ and $t_n$.

One strategy in the motion detection algorithm is to define a "cost function" $J(\theta_n)$ as a function of the unknown parameters $\theta_n$ and to minimize this cost function with respect to $\theta_n$. Discrepancies between the results of applying different algorithms to the same data can arise from two main sources: differences in their optimization strategies for finding the minimum of the cost function; and differences in the definitions of the cost functions and their sensitivities to motion and noise. The cost functions of the algorithms used are all special cases of the least-squares cost function:

$$J(\theta_n) = \sum_{r \in \Omega} \omega(r)[f_n(r) - \alpha_n f_1(R_n r + t_n)]^2 \qquad (2)$$

where $\theta_n$, represents the six rigid body motion parameters in $R_n$ and $t_n$ in addition to the scale parameter $\alpha_n$, and n represents the regular grid of pixel positions. The function $\omega(r)$ is a weighting factor. Most motion detection algorithms employ variants of the least-squares cost function, and any discrepancies observed between their results are most likely due to differences in their optimization strategies.

The preceding motion detection algorithm is illustrative only, and is taken in part from Ardekani, Babak A., et al., "A quantitative comparison of motion detection algorithms in FMRI," *Magnetic Resonance Imaging* 19:7 (2001), 959-963, which is hereby incorporated by reference in its entirety herein.

Other examples of motion detection algorithms are provided by:

Meijering, Erik H. W., et al., "Retrospective motion correction in digital subtraction angiography: A review," *IEEE Transactions on medical imaging*, 18:1 (January 1999), 2-21, which is hereby incorporated by reference in its entirety herein;

Hensel, Marc, et al., "Motion detection for adaptive spatio-temporal filtering of medical x-ray image sequences," *Proceedings BVM* 2005, Germany: Springer, Mar. 13-15, 2005, which is hereby incorporated by reference in its entirety herein; and Bentoutou, Y., "A 3D space-time motion detection for an invariant image registration approach in digital subtraction angiography," *Computer Vision and Image Understanding*, 97:1 (January 2005), 30-50, which is hereby incorporated by reference in its entirety herein.

Frame Rate

According to embodiments of the present invention, since the frame rate is variable, a starting, or initial, frame rate is defined. The initial frame rate for a sequence may be set to the typical or expected frame rate of the application. For example, 25 fps (high) for cardiac applications, 15 fps (medium) for angiographic procedures, and 8 fps (low) for neuro applications may be used as starting, or initial, frame rates.

Figure 5:
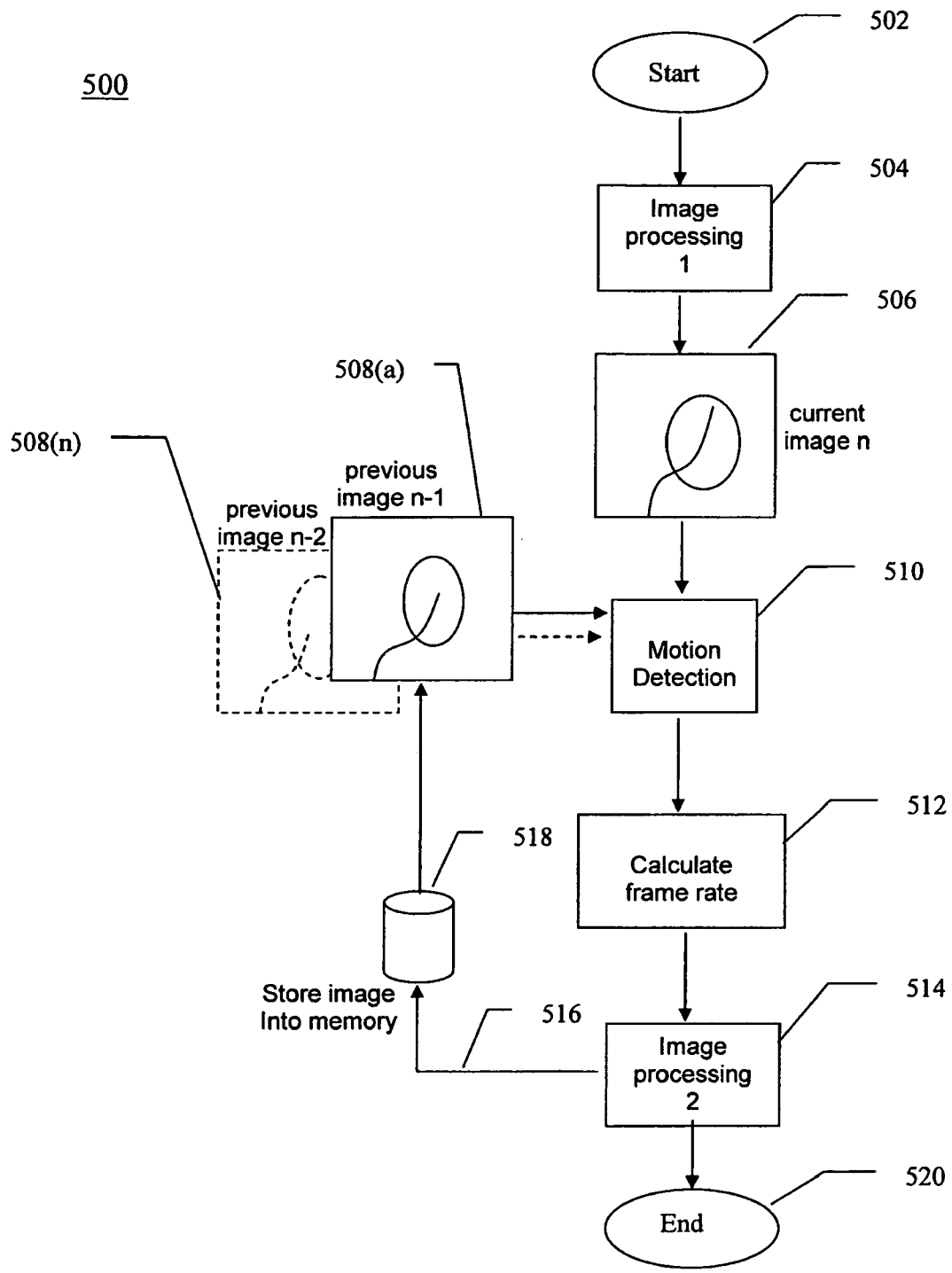
FIG. 5 shows a diagram to calculate a frame rate.

FIG. 5 shows a diagram 500 to calculate a variable frame rate. The steps of FIG. 5 may be stored on a computer-readable medium, such as ROM, RAM, EEPROM, CD, DVD, or other non-volatile memory. Step 502 shows that the process begins.

Step 504 shows that initial image processing is performed. This includes identifying an initial frame rate. It may also include other image processing such as defect correction, image enhancement, edge detection, etc. Step 506 shows that current image data is accessed. This data may be accessed from a memory or received from an x-ray detection module. Step 510 shows that a motion detection algorithm is accessed. The motion detection algorithm detects relative motion between the current image data and previous image data, shown as 508(a) . . . (n) (where "n" is any suitable number). The previous image data may include, for example, a sample of previous image data, an average of previous image data or a selected quantity of previous image data.

The motion detection algorithm determines a difference between the current image data (506) and the previous image data (508). Step 512 shows that a frame rate is calculated based on results from the motion detection algorithm.

Step 514 shows that image processing is performed to adjust the frame rate of the image data. Other image processing, such as defect correction, image enhancement, edge detection, etc., may also be performed at Step 514. Line 516 shows that the processed image data, established in step 514, may be saved, as shown by storing step 518. This processed image data may then be used as previous image data (508) and thereby update the calculation of a new frame rate via an iterative process.

Step 520 shows that the process ends.

Application specific minimum frame rates are typically specified, and the system establishes higher frames rates (or shorter time intervals between images) if motion is detected.

Desired display of images typically utilizes a minimum frame rate (e.g., a frame rate of 30 fps or higher). If the acquisition frame rate is below this value, images may be "filled in" if necessary, using one of any number of image interpolation schemes, such as bi-linear interpolation, bi-cubic interpolation, class-coding interpolation, etc. Any image interpolation scheme is within the scope of this invention.

Pulse Length

Figure 6:
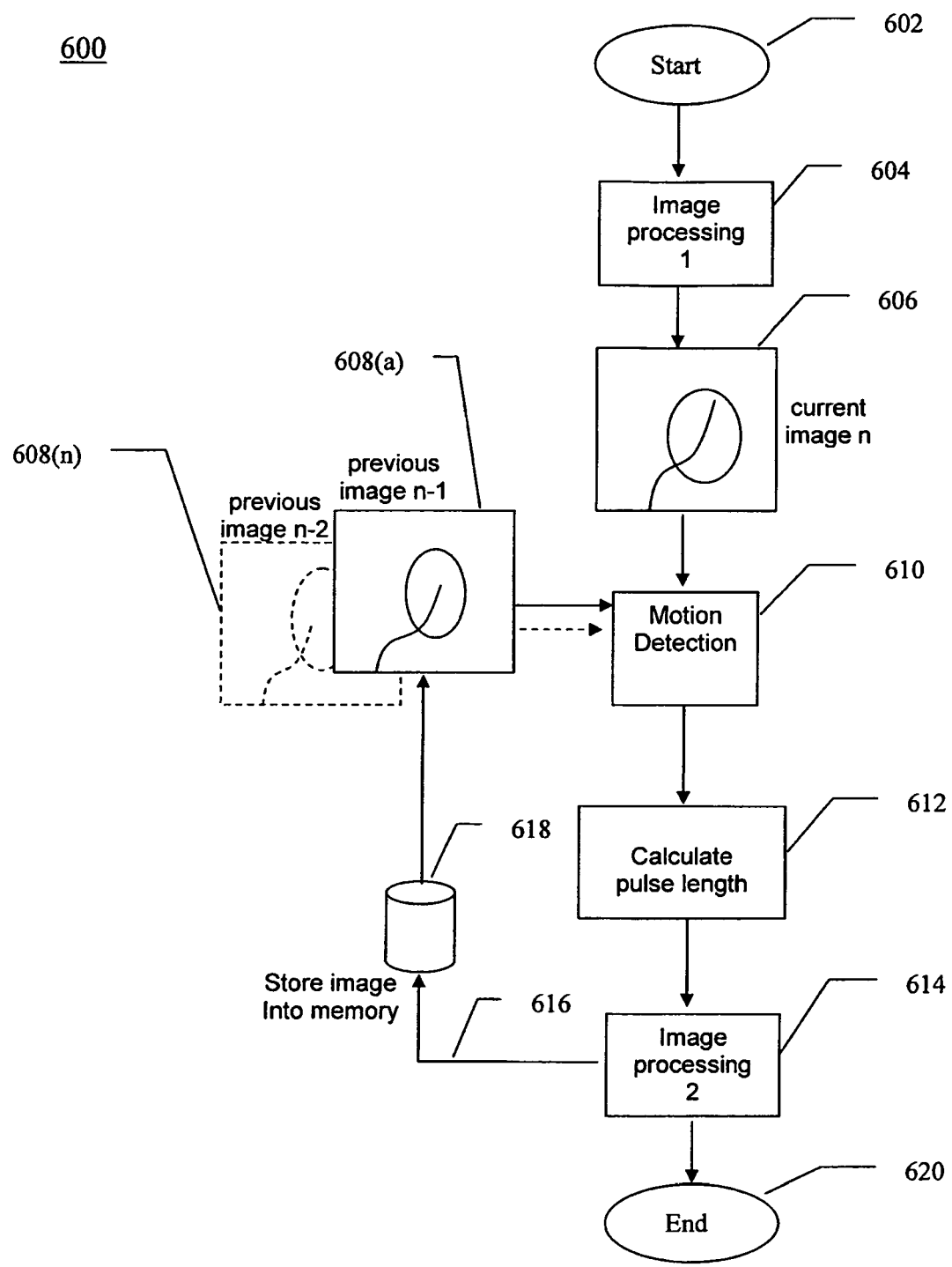
FIG. 6 shows a diagram to calculate a pulse length.

FIG. 6 shows a diagram 600 to calculate a pulse length. The steps of FIG. 6 may be stored on a computer-readable medium, such as ROM, RAM, EEPROM, CD, DVD, or other non-volatile memory. Step 602 shows that the process begins.

Step 604 shows that initial image processing is performed. This includes identifying an initial pulse length. It may also include other image processing, such as defect correction, image enhancement, edge detection, etc; Step 606 shows that current image data is accessed. This data may be accessed from a memory or received from an x-ray detection module. Step 610 shows that a motion detection algorithm is accessed. The motion detection algorithm detects relative motion between the current image data and previous image data, shown as 608(a) . . . (n) (where "n" is any suitable number). The previous image data may include, for example, a sample of previous image data, an average of previous image data, or a selected quantity of previous image data.

The motion detection algorithm determines a difference between the current image data (606) and the previous image data (608). Step 612 shows that a pulse length is calculated based on results from the motion detection algorithm.

Step 614 shows that image processing is performed to adjust the pulse length of the image data. Line 616 shows that the processed image data, established in step 614, may be saved, as shown by storing step 618. This processed image data may then be used as previous image data (608) and thereby update the calculation of a new pulse length via an iterative process.

Step 620 shows that the process ends.

According to an embodiment of the invention, pulse length may be adjusted as a function of motion detected. For example, in a cardiac application, pulse length may vary with the actual phase of the heart beat, for example, from approximately 2 milliseconds (ms) to approximately 30 ms, if other parameters (e.g., dose, angulation, frame rate which determines a detector signal readout time, etc.) allow it. In a neuro application, longer times, for example, approximately 25 ms to approximately 50 ms, may be applied (again, depending on dose, angulation, detector signal readout time, etc.).

Combined Frame Rate and Pulse Length

Figure 7:
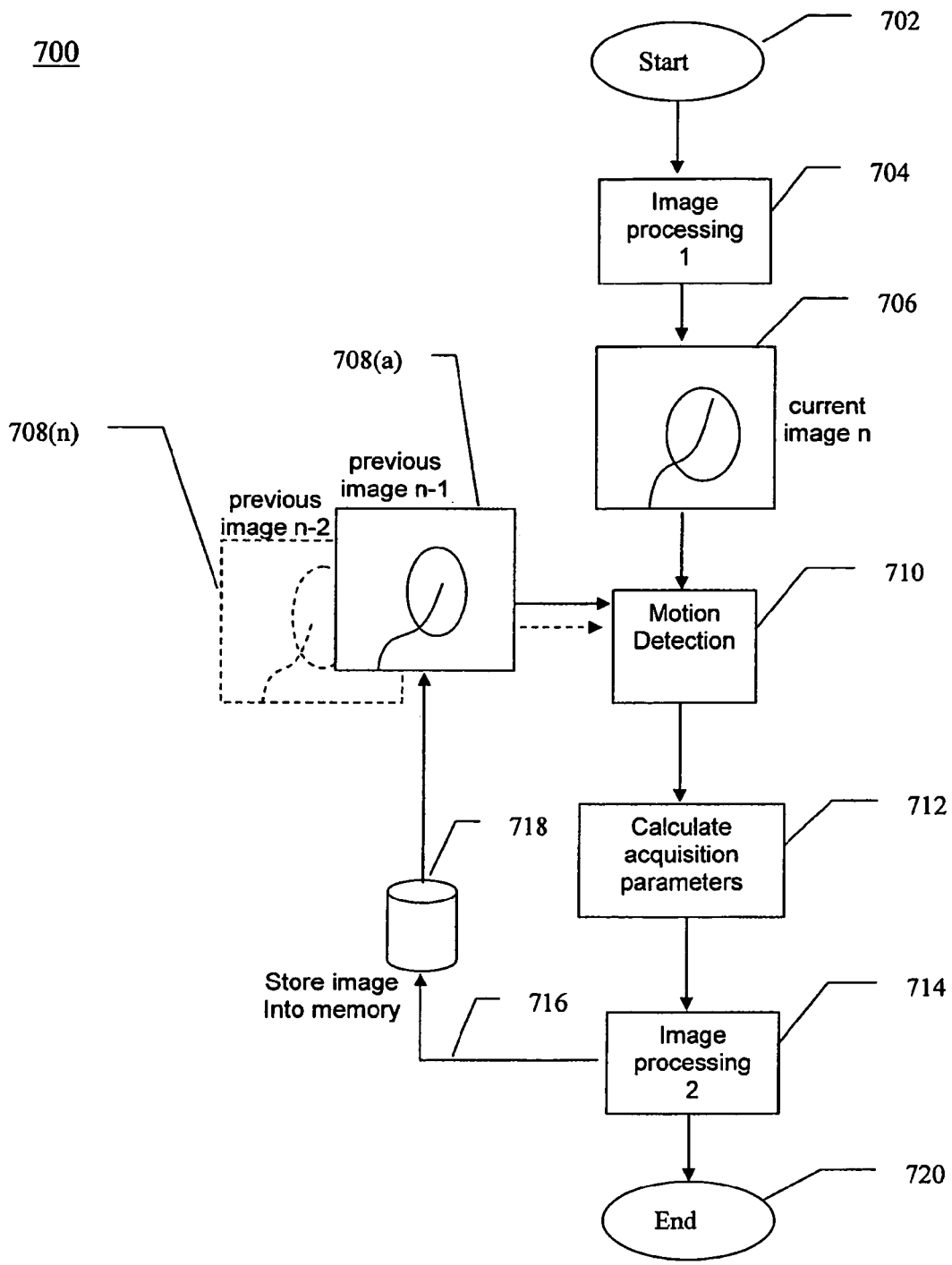
FIG. 7 shows a diagram to calculate a frame rate and a pulse length (acquisition parameters)
Figure 8:
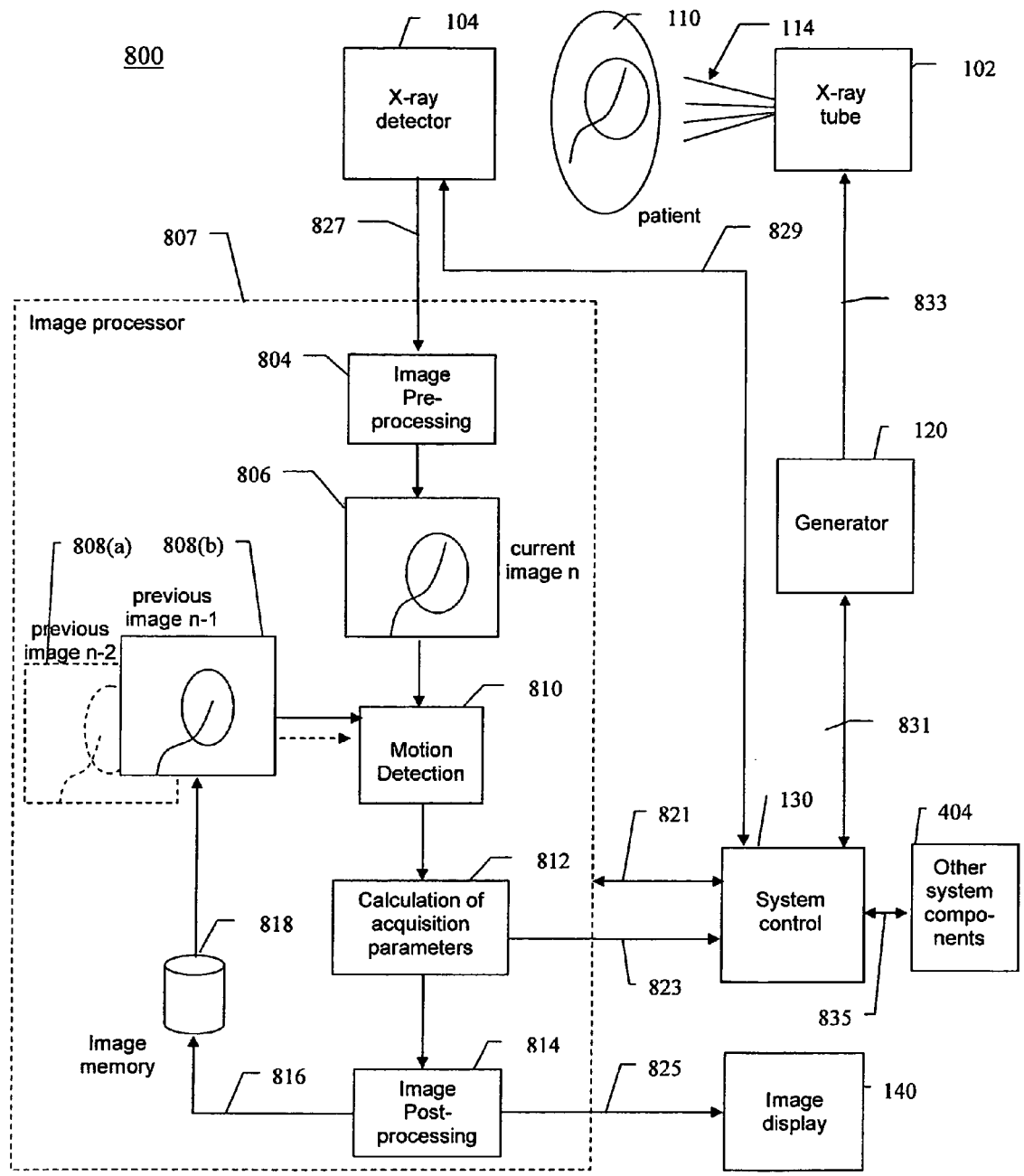
FIG. 8 shows a block diagram to calculate acquisition parameters.

As stated previously, some embodiments of the present invention are directed to determining acquisition parameters as a function of detected motion. FIGS. 7 and 8 provide examples of utilizing frame rate and pulse length as acquisition parameters.

Thus, FIG. 7 shows a diagram 700 to calculate a frame rate and a pulse length. The steps of FIG. 7 may be stored on a computer-readable medium, such as ROM, RAM, EEPROM, CD, DVD, or other non-volatile memory. Step 702 shows that the process begins.

Step 704 shows that initial image processing is performed. This includes identifying an initial frame rate and an initial pulse length. It may also include other image processing, such as defect correction, image enhancement, edge detection, etc. Step 706 shows that current image data is accessed. This data may be accessed from a memory or received from an x-ray detection module. Step 710 shows that a motion detection algorithm is accessed. The motion detection algorithm detects relative motion between the current image data and previous image data, shown as 708(a) . . . (n) (where "n" is any suitable number). The previous image data may include, for example, a sample of previous image data, an average of previous image data or a selected quantity of previous image data.

The motion detection algorithm determines a difference between the current image data (706) and the previous image data (708). Step 712 shows that acquisition data, such as frame rate and pulse length, are calculated based on results from the motion detection algorithm.

Step 714 shows that image processing is performed to adjust the frame rate and the pulse length of the image data. Line 716 shows that the processed image data, established in step 714, may be saved, as shown by storing step 718. This processed image data may then be used as previous image data (708) to thereby update the calculation of a new frame rate and a new pulse length via an iterative process.

Step 720 shows that the process ends.

FIG. 8 shows block diagram 800 that includes structure (modules) and shows the functionality of the modules to calculate acquisition parameters. The examples of acquisition parameters shown in FIG. 8 include a variable frame rate and a variable pulse length. FIG. 8 shows an x-ray generator 120, an x-ray emitter 102, an x-ray detector 104, a patient 110, image processing module 807, system control unit 130, other system components 404, and image display unit 140.

As described above, an x-ray emitting unit 102 is adapted to emit x-rays 114 (identifying a plurality of x-ray signals), and x-ray detecting unit 104 is adapted to absorb and measure the emitted x-rays, after exposure to patient 110. Images of all or parts of the patient 110 may be obtained using the x-ray emitter unit 102, x-ray detector unit 104, and x-ray signals 114.

The generator unit 120, which has been described above, is coupled to x-ray emitting unit 102 via transmission medium 833, and is used to generate the x-rays emitted by the x-ray emitting unit 102.

A system control unit 130 controls the operation of the system 800 as described above. The system control unit 130 is coupled to other system components 404, such as BIOS, logic gates, and hard-wired circuits such as ASICs and other integrated circuits (ICs) via bi-directional transmission medium 835. The system control unit 130 is also coupled to image processing module 807 via bi-directional transmission medium 821 and to a calculation module 812, via communication line 823. System control unit 130 is coupled to x-ray detecting unit 104 via transmission medium 829. The system control unit 130 provides control signals to generator unit 120, via medium 831, detector unit 104, via medium 829, and image processing module 807, via medium 821. These control signals control, in part, operation of these units.

Image processing module 807 includes program code, memory and processing modules to perform image processing. Specifically, initial image processing is performed by processing module 804, which receives input from x-ray detector 104 via transmission line 827. Module 804 includes program code to perform processing on the received x-ray image data to produce current image data, as shown by block 806. Input data may include an initial frame rate and an initial pulse length. The current image data is transmitted to motion detection module 810, which also receives one or more previous image data. The motion detection module 810 determines relative motion between the current image data 806 and the previous image data 808. (The previous image data may represent accumulated previous image data, or a sequentially previous image, or a combination.)

Calculation module 812 calculates a frame rate, a pulse length, and other acquisition parameters, based on the motion detected by the motion detection module 810.

Processing module 814 performs image processing to adjust the frame rate and/or the pulse length of the image data. Other image processing, such as defect correction, image enhancement, edge detection, etc., may also be performed in processing module 814. The processing module 814 is coupled, via transmission medium 825, to image display module 140. Line 816 shows that the processed image data, established by module 814, may be saved, as shown by storing module 818. This processed image data may then be used as previous image data (808) to thereby update the calculation of a new frame rate, a new pulse length, and/or other new image acquisition parameters via an iterative process.

Figure 9A:
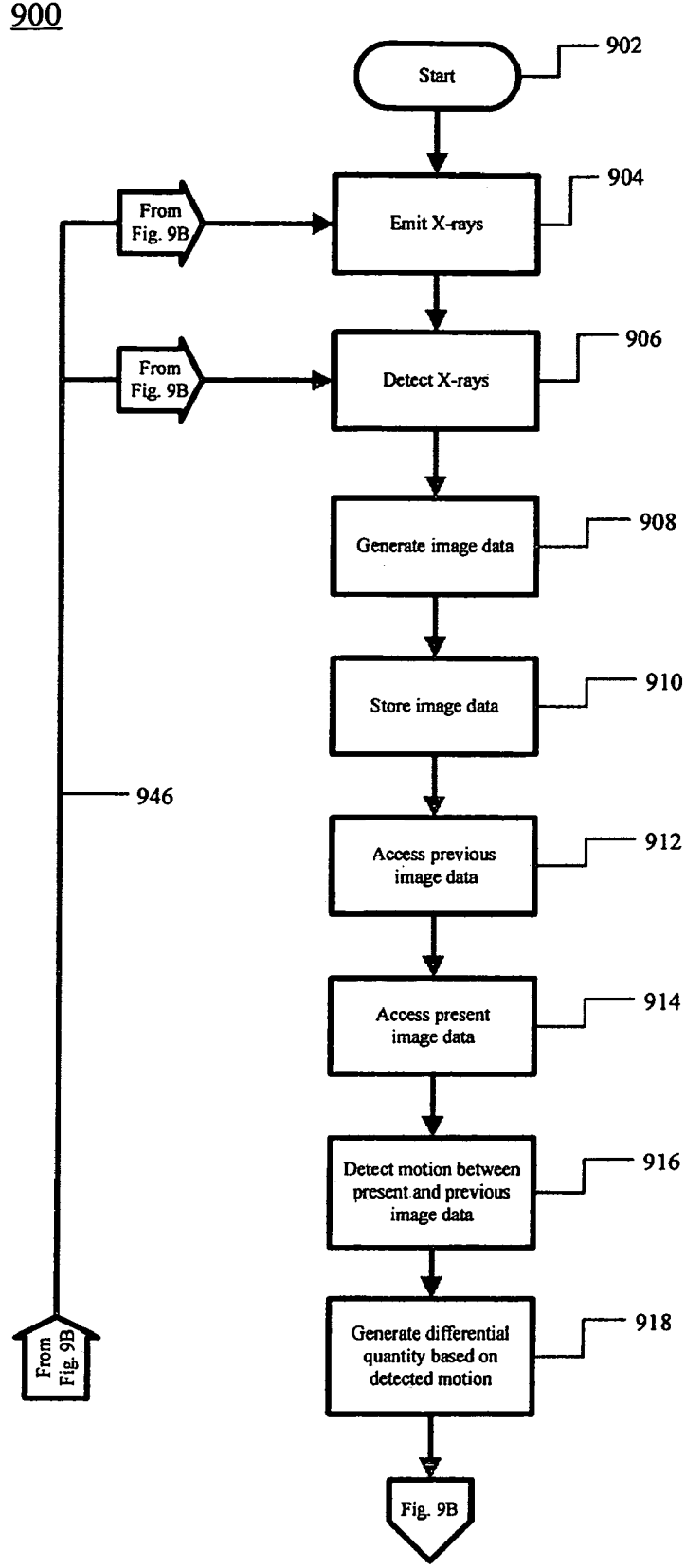
FIGS. 9A and 9B show a flowchart to determine acquisition parameters.
Figure 9B:
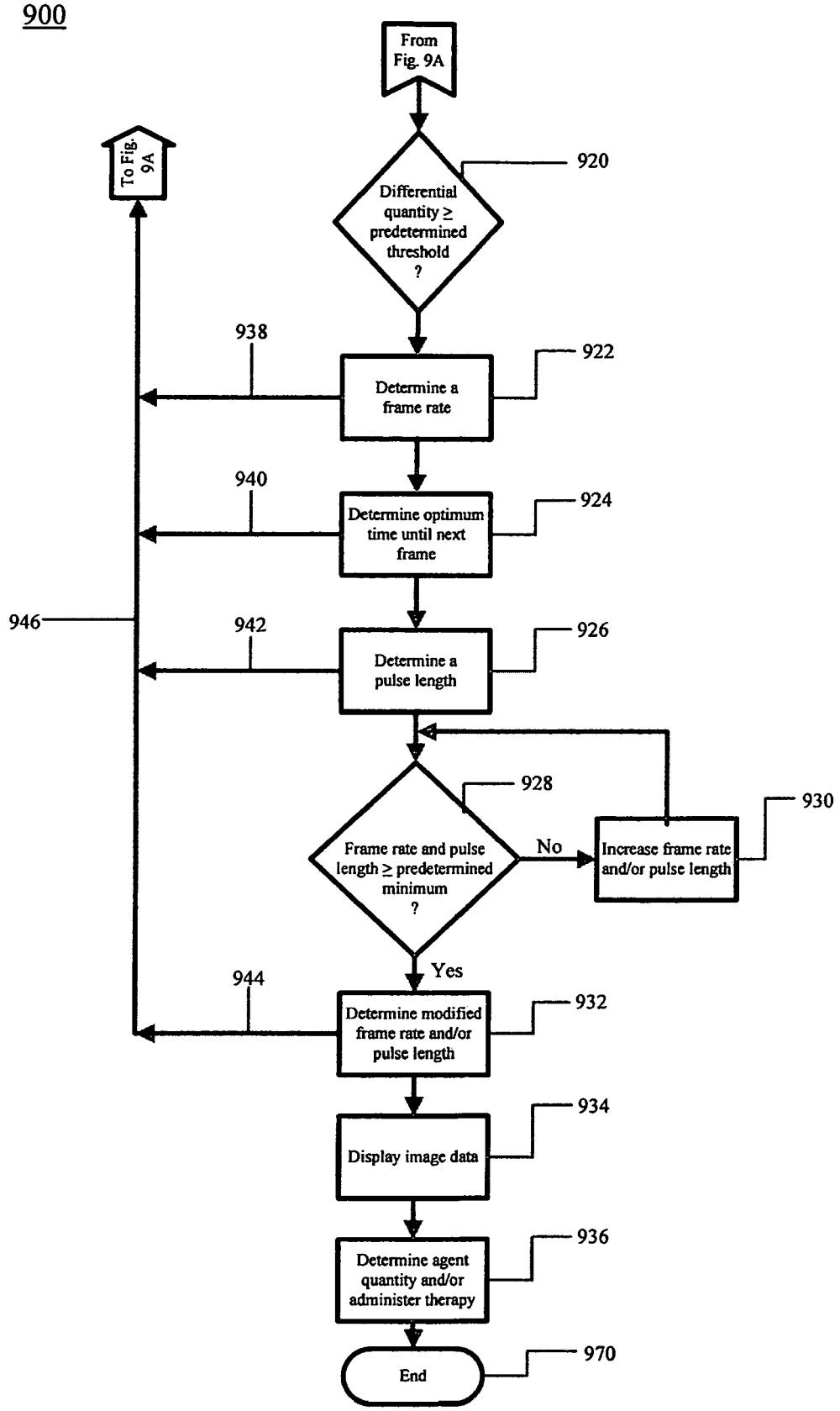

FIGS. 9A and 9B show a flowchart 900 to determine acquisition parameters. Step 902 shows that the process begins. X-rays are emitted, typically from an emitting unit, as shown in step 904. The emitted x-rays are detected as shown in step 906, typically by a detecting unit. The detected x-rays are used to generate image data, as shown in step 908, which are stored in memory, as shown in step 910. Previous image data, representative of past x-ray images, is accessed from memory, as shown in step 912 and present image data, representative of a current x-ray image, is accessed from memory, as shown in step 914.

Motion between the present image data and previous image data is detected, as shown in step 916. This motion may be detected by a motion detection module that executes program code to perform the motion detection function. The previous image data and the present image data are compared to establish a differential quantity, as shown in step 918.

The differential quantity is compared to a predetermined threshold, which represents a minimum acceptable motion, as shown in decision step 920.

When the differential quantity does not exceed the predetermined threshold in step 920, current system settings are maintained.

When the differential quantity exceeds the predetermined threshold (step 920), a frame rate is determined as shown in step 922. This frame rate data may be provided to x-ray emitting step 904 and x-ray detecting step 906, as shown by line 938 and line 946, to modify, or adjust, the rate of x-ray emission and x-ray detection.

Following the determination of a frame rate in step 922, an optimum time between frames may be calculated based on the determined frame rate, as shown in step 924. Line 940 shows that the optimum time between frames may be transmitted, shown by line 946, to the x-ray emitting step 904 and the x-ray detecting step 906 to modify, or adjust, the rate of x-ray emission and detection.

After the optimum time between frames has been determined (step 924), a second acquisition parameter, such as pulse length, may be determined, as shown in step 926. Line 942 and line 946 show that the pulse length may be transmitted to the x-ray emitting step 904 and the x-ray detecting step 906 to modify, or adjust, the pulse length the emitted x-rays.

Step 928 shows that the frame rate and pulse length are compared to predetermined minimum values. When the frame rate and pulse length do not exceed the predetermined minimum values, line 929 shows that step 930 is reached. Step 930 increases the frame rate and/or pulse length and line 927 shows that decision step 928 is reached again.

When the frame rate and pulse length exceed the predetermined minimum values, line 931 shows that step 932 is reached. In step 932, a modified frame rate and/or pulse length is determined. Lines 944 and 946 show that the modified pulse length and/or modified frame rate may be transmitted to the x-ray emitting step 904 and x-ray detecting step 906 to modify, or adjust, the x-ray emission and x-ray detection.

As described above, the image data may be displayed, as shown in step 934. In this embodiment, both frame rate and pulse length have been determined and used. However, other image acquisition parameters may also be determined and used, in the same manner as described above.

While, or after, the image data is displayed, as shown in step 934, a quantity of an agent, such as a drug or contrast medium, may be determined, as shown in step 936, and a therapy administered as shown in step 936. The process ends, as shown in step 970.

Thus, as described above, variable frame rates and variable x-ray pulse lengths may be applied either separately, in combination, or in combination with other image acquisition parameters.

It will be appreciated from the above that the invention may be implemented using hardware, as well as computer software, which may be supplied on a storage medium or via a transmission medium, such as a local-area network or a wide-area network, such as the Internet.

While particular embodiments of the invention are described in relation to processors and electronic memories, it is to be appreciated that multiple processors and multiple electronic memories may be used to implement all, or a portion, of the processing and storage functions of the embodiments of the present invention.

Although illustrative embodiments of the invention have been described in detail with reference to the accompanying drawings, it is to be understood that the invention is not limited to those precise embodiments, and that various changes and modifications may be effected therein by one skilled in the art without departing from the scope and spirit of the invention as defined by the appended claims.

What is claimed is:

1. A method for determining one or more image acquisition parameters, comprising:
   accessing previous image data, generated from x-rays;
   accessing present image data, generated from x-rays;
   detecting motion between the present image data and at least a portion of the previous image data; and
   determining the one or more image acquisition parameters as a function of the motion detected in the detecting step, wherein the image acquisition parameters include a pulse length.

2. The method according to claim 1, wherein the image acquisition parameters further include at least one of a frame rate, a temporal filtration, and a focal spot size.

3. The method according to claim 1, further comprising:
   generating image data to be accessed in the accessing steps.

4. The method according to claim 3, further comprising:
   controlling the image data generating step based on the determined image acquisition parameters.

5. The method according to claim 3, further comprising:
   emitting x-rays; and
   detecting the emitted x-rays.

6. The method according to claim 5, further comprising:
   maintaining a focus setting of the emitted x-rays when the detected motion does not exceed a predetermined threshold.

7. The method according to claim 5, further comprising:
   emitting a required dose of x-rays while a power setting of the emitted x-rays does not exceed a predetermined threshold.

8. The method according to claim 5, further comprising:
   preventing over-heating of an x-ray unit while a power setting of the emitted x-rays does not exceed a predetermined threshold.

9. The method according to claim 1, wherein the determining step determines the one or more image acquisition parameters as a function of biometric data.

10. The method according to claim 1, wherein the detecting step further comprises:
    comparing the present image data to at least a portion of the previous image data.

11. The method according to claim 1,
    wherein the image acquisition parameter is increased when the detected motion is above a predetermined threshold, and
    wherein the image acquisition parameter is decreased when the detected motion is below a predetermined threshold.

12. The method according to claim 1,
    wherein the image acquisition parameter is decreased when the detected motion is above a predetermined threshold, and
    wherein the image acquisition parameter is increased when the detected motion is below a predetermined threshold.

13. The method according to claim 1, further comprising:
    determining an optimum time until a subsequent image acquisition.

14. The method according to claim 1, further comprising:
    determining the image acquisition parameter as a function of relative motion detected in the present image data.

15. The method according to claim 14, wherein the relative motion is a movement of a medical device, an organ, a patient, a table, an x-ray source, or an x-ray detector.

16. The method according to claim 1, further comprising:
determining a quantity of an agent as a function of the determining step,
wherein the agent is a contrast medium or a glue.

17. The method according to claim 1, wherein the image acquisition parameter is maintained greater than or equal to a minimum value.

18. The method according to claim 1, further comprising:
selecting a minimum value as a starting image acquisition parameter.

19. An apparatus for determining one or more image acquisition parameters, comprising:
means for accessing previous image data, generated from x-rays;
means for accessing present image data, generated from x-rays;
means for detecting motion between the present image data and at least a portion of the previous image data; and
means for determining the one or more image acquisition parameters as a function of the motion detected by the detecting means, wherein the image acquisition parameters include a pulse length.

20. The apparatus according to claim 19, wherein the image acquisition parameters further include at least one of a frame rate, a temporal filtration, and a focal spot size.

21. The apparatus according to claim 19, further comprising:
means for generating image data to be accessed by the accessing means.

22. The apparatus according to claim 21, further comprising:
means for emitting x-rays; and
means for detecting the emitted x-rays.

23. The apparatus according to claim 19, wherein the means for detecting further comprises:
means for comparing the present image data to at least a portion of the previous image data.

24. The apparatus according to claim 19, further comprising:
means for determining an optimum time until a subsequent image acquisition.

25. The apparatus according to claim 19, further comprising:
means for determining the image acquisition parameter as a function of relative motion detected in the present image data.

26. The apparatus according to claim 19, further comprising:
means for determining a quantity of an agent as a function of the determining means.

27. A system for determining one or more image acquisition parameters, comprising:
at least one memory:
at least one processor, coupled to the at least one memory, the at least one processor adapted to execute code that performs the steps of:
accessing previous image data, generated from x-rays;
accessing present image data, venerated from x-rays;
detecting motion between the present image data and at least a portion of the previous image data; and
determining the one or more image acquisition parameters as a function of the motion detected in the detecting step. wherein the image acquisition parameters include a pulse length.

28. An x-ray imaging system for capturing x-ray image data at variable pulse-lengths and variable frame rates, comprising:
an emitting unit adapted to emit x-rays;
a detecting unit adapted to detect the emitted x-rays;
an image generating unit adapted to generate frames of image data as a function of the detected x-rays;
a motion detection unit adapted to detect motion between one or more preceding frames and a current frame;
a calculation unit adapted to calculate an optimum frame rate and/or an optimum pulse length as a function of the detected motion; and
a control unit adapted to control a pulse length and/or a frame rate of the emitting unit and the detecting unit based on the optimum frame rate and the optimum pulse length,
wherein the emitting unit and the detecting unit are configured to support variable pulse lengths and variable frame rates.

* * * * *